Sept. 25, 1951

J. H. PRATT 2,568,868

OSCILLATION GENERATOR

Filed Nov. 15, 1946

INVENTOR
JOHN H. PRATT
BY H.S. Grover
ATTORNEY

Patented Sept. 25, 1951

2,568,868

UNITED STATES PATENT OFFICE 2,568,868

OSCILLATION GENERATOR

John Harry Pratt, Montreal, Quebec, Canada, assignor to Radio Corporation of America, a corporation of Delaware Application November 15, 1946, Serial No. 709,985

17 Claims. (Cl. 250—36)

The present invention relates to oscillation generators, and particularly to an oscillation generator adapted to operate anywhere in a frequency range of 20 cycles up to about 200 kilocycles.

An object of the present invention is to generate oscillations in the foregoing range, of constant frequency and amplitude, independent of supply voltage and tube characteristic variations.

Another object is to provide a highly stable audio frequency oscillator which generates oscillations of constant frequency and amplitude, despite changes in supply voltages, tube replacements, tube aging, etc.

A further object is to provide a highly stable oscillation generator having two separate feedback paths, one of which is regenerative and the other which may be either regenerative or degenerative, and a parallel-T network in circuit therewith so constructed and arranged with associated circuit elements that the generator is constrained to operate at a particular frequency.

Briefly stated, the oscillator of the invention comprises a high gain pentode amplifier vacuum tube whose output is coupled to a cathode follower vacuum tube, both of which have a common cathode circuit arranged in a regenerative circuit. The cathode of the cathode follower tube is connected to the control grid of the high gain amplifier tube through a resistance-capacitance network acting as a frequency determining element. This network is a parallel-T network similar in operation to a bridge circuit. A biased diode is arranged in the input circuit of the high gain amplifier tube to control the amplitude of the generated oscillations. At or near the null frequency of the resistance-capacitance network, the gain of the pentode amplifier tube is normal, but at all other frequencies the gain is reduced by degenerative (negative) feedback through this network. The term "null frequency" is herein used to designate that frequency at which the network has infinite attenuation and passes no energy; or putting it in other words, that frequency at which there is zero transmission through the network.

Figure 1:
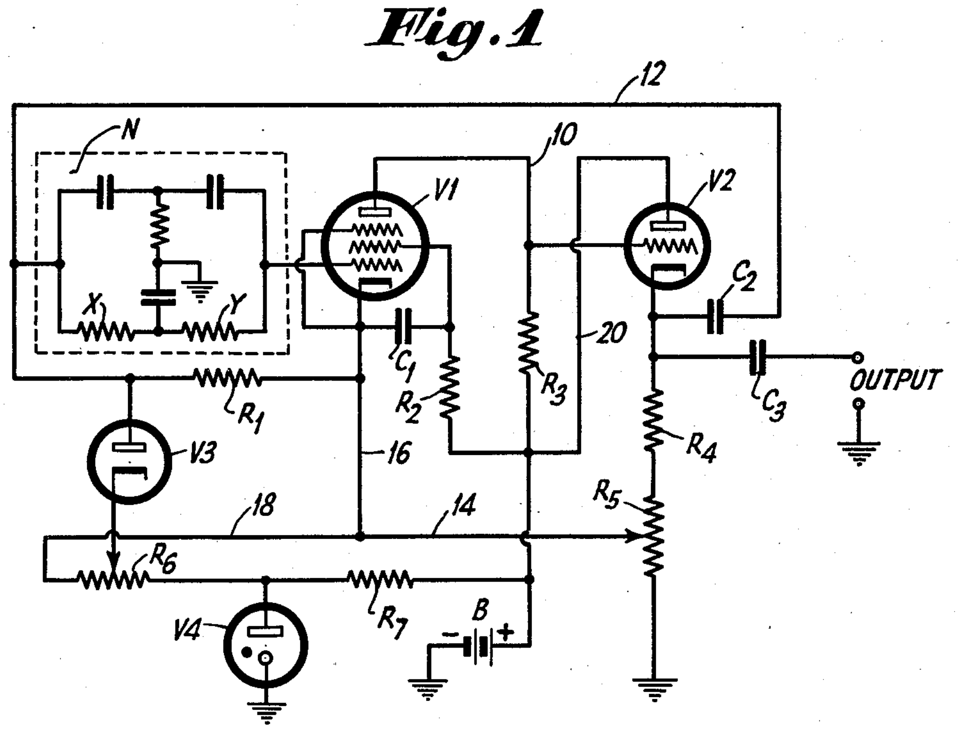
Figure 2:
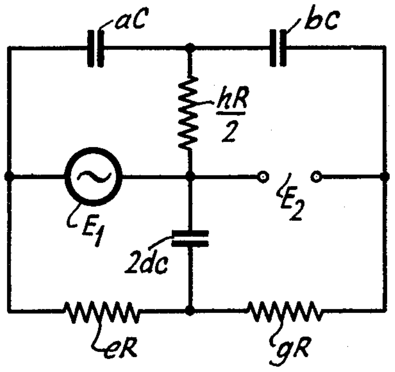
Figure 3:
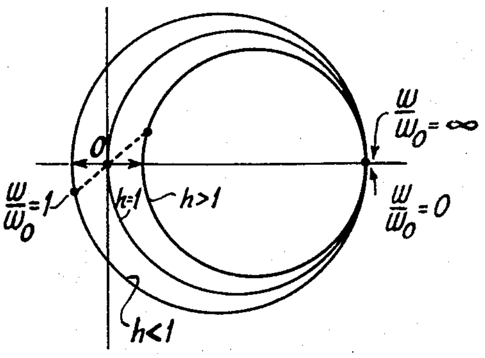

A more detailed description of the invention follows in conjunction with a drawing, wherein Fig. 1 illustrates an oscillation generator circuit in accordance with the invention;

Fig. 2 illustrates a resistance-capacitance network of the type employed in Fig. 1, and is given to explain the operation of the system of Fig. 1, and Fig. 3 is a system of curves given for purposes of explanation in connection with an analysis of the network of Fig. 2.

Referring to Fig. 1 of the drawing, there is shown a high gain pentode vacuum tube V1 whose anode is connected by way of lead 10 to the grid of a triode cathode follower vacuum tube V2 and whose cathode is connected by way of leads 16 and 14 to a tap on resistor R5 which is common to the cathodes of both tubes V1 and V2. The cathode follower V2 has substantially unity amplification and provides a low impedance output from its cathode.

Connected between the first grid of tube V1 and the cathode of tube V2 via lead 12 and condenser C2 is a resistance-capacitance parallel-T frequency determining selective network N. Reference is herein made to the article by H. H. Scott in the Proc. IRE, February, 1938, pages 226 et seq., which describes circuits using such a frequency determining parallel-T network.

Anode polarizing potential for the tubes V1 and V2 is supplied by battery B. The negative terminal of battery B is grounded and its positive terminal is connected to the anode of V1 through resistor R3 and lead 10. The anode of tube V2 is connected to battery B through lead 20. The screen grid of tube V1 is connected to the positive terminal of battery B through resistor R2, and to the cathode of this tube through by-pass condenser C1.

It should be noted that the cathode of the cathode follower tube V2 is connected to ground through resistors R4 and R5 in series.

For the control of the amplitude of oscillations, there is provided a diode V3 whose anode is directly connected to lead 12, and to the cathode of tube V1 through resistor R1. The cathode of the diode V3 is connected to a tap on resistor R6. One end of resistor R6 is connected to the cathode of tube V1 through lead 13, while the other end of this resistor is connected through resistor R7 to the positive terminal of battery B. The value of resistor R6 is low compared to the value of resistor R1. A voltage regulator tube V4 is connected between ground and the junction point P of the resistors R6 and R7. In effect, the resistors R6 and R7 comprise a voltage divider which divides the total voltage of battery B. The voltage regulator tube V4 always passes current and maintains the voltage between point P and ground constant despite variations in voltage of battery B and current through resistor R6.

Output is taken from the cathode of the follower tube V2 via condenser C3, as shown.

The operation of the oscillation generator system of Fig. 1 will now be given. Tubes V1 and V2 are interconnected regeneratively by virtue of the feedback path which includes lead 10 connecting the anode of V1 to the grid V2, the grid-cathode impedance of tube V2, the cathode circuit of tube V2 including common resistor R5, and leads 14 and 16 extending back to the cathode of tube V1. At the null frequency of the resistance-capacitance network N (at which frequency there is infinite attenuation in the network or zero transmission therethrough), the oscillator V1, V2 will oscillate on account of the aforementioned regenerative circuit. At this null frequency of the network, the gain of the amplifier system V1 and V2 (neglecting the effect of the regenerative circuit) is normal.

At frequencies above and below the null frequency of the parallel-T network N, the gain of the system is reduced by virtue of the negative or degenerative feedback through the feedback path which includes condenser C2, lead 12 and network N. This degenerative feedback off-sets the regenerative feedback through resistor R5 and leads 14 and 16, so that oscillations are constrained to occur only at the null frequency of the network N. Stated in other words, sufficient positive feedback (regenerative) is supplied by the common cathode connection on resistor R5 to make the amplifier system oscillate.

Diode V3 will only pass current when the voltage on its anode is of positive polarity relative to its cathode. When the peak oscillation voltage applied to the anode of the diode V3, via condenser C2 and lead 12 is greater than the D. C. bias applied to the cathode of the diode through resistors R7, R6 and tube V4, then the diode will pass current. It will be evident that the voltage regulator tube V4, in effect, provides a reference voltage for point P which determines the amplitude of the generated oscillations. The flow of current through resistor R1 when diode V3 passes current causes an IR voltage drop across R1 which is reflected as a negative bias on the first grid of tube V1 through the series resistive components X and Y of the parallel-T network N.

The circuit connections which include diode V3, resistor R1, leads 16 and 18, resistors R6, R7 and voltage regulator tube V4 prevent the first grid of the high gain tube V1 from going positive, and limit the oscillation amplitude to the linear portion of the anode current-grid voltage characteristic of the tube V1. Otherwise, the voltage on the grid of V1 would build up until overloading caused the losses in the system to equal the gain which is undesirable since linear operation is desired. The circuit arrangement described above prevents this large excursion of grid voltage of the tube V1.

It will thus be seen that when the peak voltage applied to the anode of diode V3 is greater than the D.-C. bias applied to its cathode, the diode will conduct and develop a voltage across resistor R1 which makes the first grid of tube V1 more negative with respect to the cathode of V1, hence causing the gain of tube V1 to be reduced sufficiently to maintain the oscillation amplitude constant at a value closely equal to the D.-C. voltage between the cathode of the diode V3 and ground.

The regenerative feedback through follower tube V2, resistor R5 and leads 14 and 16 is independent of frequency. The magnitude and phase of the degenerative feedback through follower tube V2, condenser C2, lead 12 and network N is, however, dependent upon frequency. At the null frequency, the degenerative feedback is zero, and at all other frequencies is finite. Only at the null frequency will the product of the gain of the amplifier V1, V2 and its associated network, and the total feedback transmissions (including both degenerative and regenerative) be real and positive and equal to unity which is a necessary condition for oscillations to exist. At frequencies other than the null, the product of the forward gain and the feedback (called the "loop transmission") will either have an imaginary component, or if real, will be less than unity and oscillations will not occur. The adjustment of the tap on resistor R5 is such that this necessary condition is fulfilled at a D.-C. voltage on the first grid of tube V1 which will bias this tube at or near the center point of the linear portion of the anode current-grid voltage characteristic.

In the description given so far, it has been assumed that the system operates on the null frequency of the resistance-capacitance network N and that the amplifier passes all frequencies to the same extent without pulse shift. In practice, however, the system is made to operate slightly off the null frequency at a point where there is some positive (regenerative) feedback through the network via condenser C2 and lead 12, but not sufficient to cause oscillations, and then an additional positive (regenerative) feedback supplied through resistor R5 and leads 14 and 16. This is done in order to avoid oscillations at some frequency other than the desired frequency. Undesired oscillations can occur because, in practice, the amplifier does not pass all frequencies to the same degree without phase shift. When the resistors and capacitors of the network N have such values as to be slightly above the values which will produce a true null at a certain frequency then there is a residual positive or regenerative feedback through the network at a frequency near the null frequency and on the low side thereof. Similarly, when the resistors and capacitors of the network N have such values as to be slightly below the values which will produce a true null at a certain frequency, then there is a residual negative (degenerative) feedback through the network at a frequency near the null frequency but on the high side of the null frequency.

In practicing the invention, I work with tolerances on the resistance and capacitance components of the network N such that the residual feedback is always positive but not sufficient of itself to cause oscillations. This is done by judicious selection of the elements of the parallel-T network. The reason for this is to insure that the product of the gain of the amplifier V1, V2 and its associated elements and the total feedback is not real, positive and greater than unity at some low frequency other than the desired frequency and which might be determined by the phase shifts in the time constants of the screen grid by-pass capacitor C1, the series screen grid resistor R2, the coupling condenser C2, the resistive components of network N and the source impedance of the power network, and thus cause undesired oscillations, sometimes called motor-boating, at this undesired frequency. Such undesired oscillations might occur if the residual feedback through the network N were degenerative, necessitating an increase in the regenerative feedback over the path R5, leads 14 and 16, to obtain oscillations. The elements of the network N are so adjusted in the practice of the invention, that it always has a 180° phase shift at the oscillation frequency.

The system of the invention could be so designed that a residual negative feedback is obtained through the network N with a corresponding increase in the regenerative feedback over the common cathode circuit, provided due precautions are exercised to avoid the motor-boating effect at undesired low frequencies.

The reasons for the excellent stability of this oscillator with changes in supply voltages, tube replacements, tube aging etc. may be found by an analysis of the parallel-T network, with particular reference to Fig. 2.

It may be shown that the transmission of the network of Fig. 2 is given by:

$$\frac{E2}{E1}=\frac{1}{1+\frac{x}{y}} \qquad (1)$$

where E1 is the voltage developed between cathode of V2 and ground, E2 is the voltage developed between first grid of V2 and where $x$ and $y$ are complex quantities given by:

$$\frac{x}{y}=\frac{-\frac{\omega}{\omega_0}(2dg+ag+be)-j\left(\frac{\omega}{\omega_0}\right)^2[dgh(a+b)+2adeg]}{\frac{\omega}{\omega_0}h\left[\left(\frac{\omega}{\omega_0}\right)^2 abdeg-\frac{a+b}{2}\right]+j\left[1-\left(\frac{\omega}{\omega_0}\right)^2 hab\left(\frac{e+g}{2}\right)\right]} \qquad (2)$$

where $$\omega_0=\frac{1}{RC}$$

and $\omega=2\pi f$ and where $a$, $b$, $d$, $e$, $g$, and $h$ are multiplying factors denoting excursions from the nominal values of R and C of the network which will give a true null at the frequency where $\omega=\omega_0$. When $a$, $b$, $d$, $e$, $g$ and $h=1$ the following relation holds true $$\frac{x}{y}=-j\frac{4\frac{\omega}{\omega_0}}{\left(\frac{\omega}{\omega_0}\right)^2-1} \qquad (3)$$

and $$\frac{E2}{E1}$$

approaches zero as $$\frac{\omega}{\omega_0}$$

approaches unity.

The rate of change of phase at $$\frac{\omega}{\omega_0}=1$$

is infinite. It is this latter property of the network which makes the oscillator so stable. It is well known that for oscillations to start, the product of the forward gain and the backward gain of the system plotted in the complex plane must encircle the point 1, 0 and that when steady state oscillations exist the product of the forward gain and backward gain is real, positive and equal to 1. This fact is commonly expressed in the equation:

$$\mu\beta=1$$

where $\mu$ is the complex forward gain and $\beta$ the complex backward gain (usually a loss). In this case $\mu$ is the gain of the amplifier and $\beta$ is the sum of the transmission of the parallel-T network and the ratio of the voltage introduced in the cathode circuit of V1 to the amplifier output voltage. The second part of $\beta$ may be assumed to be real, positive and independent of frequency. It can be readily seen that if the phase of $\mu$ changes for any reason, as it will for example if the anode-resistance or input conductance of the tubes change with anode supply voltage or with age, the frequency must change so as to keep $\mu\beta=1$. However, if the rate of change of phase of $\beta$ with frequency is very great, the frequency need only change very little to effect the required phase shift. The oscillator is then very stable.

In the practical case, the capacitances and resistances in the bridged-T network are never exactly the correct values to give zero transmission and infinite rate of change of phase. Also, the phase shift of the amplifier is not zero. The phase shift of the amplifier is kept low by the direct-coupled feature and by the use of the cathode-follower, having a low source impedance, to supply the parallel-T network.

If one or more of the parameters $a$ to $h$, in Equation 2 is allowed to deviate from its "normal" value of unity, it will be found that $E2/E1$ does not approach zero for any value of $$\frac{\omega}{\omega_0}$$

However, for some frequency the transmission will be real and either negative or positive depending upon whether the parameter is less than or greater than zero. For example, if the transmission of the network N is plotted in the complex plane for various values of $h$ but with factors $a$, $b$, $d$, $e$ and $g$ of the network of Fig. 2 equal to unity, curves such as those shown in Fig. 3 are obtained. In Fig. 3 the real part of the transmission of the network is plotted along the abscissa and the imaginary part along the ordinate.

It is of course desirable to operate as near the balance point (transmission equals zero) as possible for the rate of change of phase is then maximum, however, the tolerances of the resistors and capacitors must be allowed for, and some means of correcting for them must be supplied. It is hardly practical to supply separate adjusting means on all components of the parallel-T circuit. In most cases, only one frequency adjusting control is permissible. For audio frequencies it is generally more desirable to vary resistance than capacitance since the values of the capacitances in the circuit are comparatively large when precision wire-wound resistors are employed, because the resistance obtainable in the latter is limited. It is convenient to adjust the resistance in the center leg. The value of $h$ for $$\frac{\omega}{\omega_0}=1$$

and the imaginary part of $E2/E1=0$ (which is the necessary condition for oscillation at the null frequency) may be found by solving the quadratic equation.

$$h^2dg(a+b)\left(abdeg-\frac{a+b}{2}\right)+h\left[ab\left(\frac{e+g}{2}\right)(2dg+ag+be)+2adeg\left(abdeg-\frac{a+b}{2}\right)\right]-(2dg+ag+be)=0 \qquad (4)$$

When $a=b=d=k$ and $e=g=m$ (which means that capacitors of the network are equal and the resistors of the network are equal and may be said to be at the maximum or minimum limit of their tolerance) this simplifies to $$h^2k^2(k^2m^2-1)+hk^2m(k^2m^2+1)-2=0 \quad (5)$$

The correct value of $h$ is of course the positive one. When $k$ and $m$ are less than unity, and the value of $h$ from Equation 5 is substituted in Equation 1, $E2/E1$ is real and positive (zero phase shift), and when $k$ and $m$ are greater than unity $E2/E1$ is real and negative (180 degrees phase shift).

It is not desirable to operate with $E2/E1$ positive at the oscillation frequency for the following reason: When $E2/E1$ is positive and real, negative feedback exists around the amplifier because of the inherent 180° phase shift in amplifier tube V1. This means that sufficient positive feedback must be supplied by the regenerative circuit in the cathode of V1 to overcome this residual negative feedback with the result that a relaxation oscillation involving the amplifier tubes V1 and V2 and the control tube V3 may be set up before oscillations occur at the design frequency. In this design therefore, the nominal values of R and C are so chosen that $k$ and $m$ are equal to 1 at the extreme negative tolerance. Also the maximum values of $k$ and $m$ (extreme positive tolerance) are limited to values such that the magnitude of $E2/E1$ (when $h$ is adjusted to make $$\left.\frac{E2}{E1} \text{ real at } \frac{\omega}{\omega_0}=1\right)$$

is less than the reciprocal of the gain of the amplifier. This assures that some regeneration will always be required. For example; if $k=1.04$ and $m=1.02$, corresponding to ±2% tolerance on capacitance and ±1% tolerance on resistance, it is found that $E2/E1=-0.0184$. The gain of the amplifier can therefore be as high as $1/0.0184=54.3$. The value of $h$ for these values of $k$ and $m$ is 0.8715.

When the parallel-T circuit is used in an unbalanced condition as it is in this case, when $k$ and $m$ deviate from unity, the rate of change of phase with frequency is reduced. It is however still much greater than that of other RC circuits commonly employed in oscillators and is also greater than that of a tuned circuit having a reasonable resistance-reactance ratio or Q at low frequencies. The rate of change of phase with frequency at the oscillation frequency may be calculated from the equation $$\frac{d\theta}{d\left(\frac{\omega}{\omega_0}\right)_{\left|\frac{\omega}{\omega_0}=1\right|}}=\frac{E(1-3J)-F(5G-3H)}{(G+H)(E+G+H)+(1-J)(1+F-J)}-\frac{[E(1-J)-F(GH)][2E(2G+H)+6G^2+8GH+2H^2+2F(1-2J)-4J(1-J)]}{[(G+H)(E+G+H)+(1-J)(1+F-J)]^2}$$

where $E=-4km$ $F=-2k^2m(h+m)$ $G=-hk^3m^2$ $H=-hk$ $J=-hk^2m$

For the example given above ($K=1.02$, $m=1.02$, $h=0.8751$)

$$\frac{d\theta}{d\left(\frac{\omega}{\omega_0}\right)_{\left|\frac{\omega}{\omega_0}=1\right|}}=\text{approximately } 53/fo \text{ radians per cycle}$$

This compares very favorably with the value of $0.67/fo$ radians per cycle for one commonly employed circuit using two capacitors and two resistors, and of $1.54/fo$ radians per cycle for a 4 section ladder network employing two more elements than the parallel-T network. The rate of change of phase obtained by the present invention in this illustrative case is equivalent to that obtained in an oscillator using a single tuned circuit having a Q of 16.5.

Another factor which determines the stability of an oscillator is the purity of the wave-shape. If the total voltage fed back to the input contains harmonics, these harmonics will cross-modulate in the amplifier and produce fundamental components which are not in phase with the original fundamental. The result is a shift in phase of the fundamental frequency which, as was pointed out above, results in a change of frequency. In most types of RC oscillators, including the present invention, the harmonics are fed back degeneratively and so the distortion is reduced. A comparison of the three circuits considered above shows that the second harmonic distortion is reduced in each case by the following factors:

(a) Four-element circuit: $0.149\mu$
(b) Four-section ladder network: $0.1313\mu$
(c) Parallel-T network: (present invention) $0.351\mu$ From the foregoing it will be seen that the parallel-T circuit is therefore considerably better than either of the other two circuits in this respect, and that therefore the reduction of the harmonics due to the degenerative feedback at harmonic frequencies is greater in the present invention than other types of RC oscillators.

What is claimed is:

1. A stable oscillation generator for generating a constant frequency in the range of 20 cycles to 200 kilocycles, comprising a relatively high gain tube having a first grid, a screening electrode, an anode and a cathode, a cathode follower tube having a cathode, a grid and an anode, a positive feedback circuit for said tubes including a connection between the anode of said high gain tube and the grid of the follower tube, and a common cathode connection, and a positive feedback circuit for said tubes including a resistance-capacitance parallel-T frequency determining network coupled between the first grid of said high gain tube and the cathode of said follower tube.

2. A stable oscillation generator for generating a constant frequency in the range of 20 cycles to 200 kilocycles, comprising a relatively high gain tube having a first grid, a screening electrode, an anode and a cathode, a cathode follower tube having a cathode, a grid and an anode, a positive feedback circuit for said tubes including a connection between the anode of said high gain tube and the grid of the follower tube, and a common cathode connection, and a negative feedback circuit for said tubes including a resistance-capacitance parallel-T frequency determining network coupled between the first grid of said high gain tube and the cathode of said follower tube, a resistor connecting the cathode of said high gain tube and that terminal of said network furthest removed from the first grid of said high gain tube, and means for maintaining the amplitude of oscillations constant comprising a diode having an anode connected to said terminal of said network and a cathode connected to the cathode of said high gain tube, and a voltage regulator tube for providing a reference voltage for the cathode of said diode, thus determining the amplitude of the generated oscillations.

3. A stable oscillation generator for generating a constant frequency in the range of 20 cycles to 200 kilocycles, comprising a relatively high gain vacuum tube having a cathode, first and second grids, and an anode, a cathode follower tube having a cathode, a grid and an anode, a D.-C. connection from the anode of said high gain tube to the grid of said follower tube, a source of unidirectional energy, a resistor between said connection and the positive terminal of said source, a D.-C. connection from that end of said resistor nearest said source to the anode of said follower tube, a resistor connecting the second grid of said high gain tube to said end of said first resistor, a common circuit for the cathodes of said two tubes to provide a first regenerative circuit between said two tubes, a resistance-capacitance parallel-T frequency determining network having one terminal coupled to said first grid and its other terminal coupled to said cathode of the high gain tube, the constants of said network having values to provide a second regenerative circuit between said two tubes, and a connection from said last terminal of said network to the cathode of said follower tube.

4. A stable audio frequency oscillator comprising a pentode tube and a triode cathode follower tube, a connection between the anode of said pentode tube and the grid of said follower tube, a resistor in the cathode circuit of said follower tube, a connection from the cathode of said pentode tube to a point on said resistor, to thereby provide a regenerative feedback circuit, a resistance-capacitance parallel-T frequency determining network having one terminal connected to the first grid of said pentode tube and another terminal connected to the cathode of said follower tube, a resistor connecting said last terminal of said network to the cathode of said pentode tube, to thereby provide a second regenerative feedback circuit, the constants of said system being such that the overall gain of each of said regenerative circuits is real, positive and less than unity at the operating frequency.

5. A stable audio frequency oscillator comprising a high gain pentode tube and a triode cathode follower tube having substantially unity amplification, a connection between the anode of said pentode tube and the grid of said follower tube, a resistor in the cathode circuit of said follower tube, a connection from the cathode of said pentode tube to a point on said resistor, to thereby provide a regenerative feedback circuit, a resistance-capacitance parallel-T frequency determining network having one terminal connected to the first grid of said pentode tube and another terminal connected to the cathode of said follower tube through a capacitor, a resistor connecting said last terminal of said network to the cathode of said pentode tube, to thereby provide a second regenerative circuit, means in circuit with said pentode tube for maintaining constant the amplitude of the generated oscillations, and an output circuit coupled to the cathode of said follower tube.

6. A stable audio frequency oscillator comprising a pentode tube and a triode cathode follower tube, a connection between the anode of said pentode tube and the grid of said follower tube, a resistor in the cathode circuit of said follower tube, a connection from the cathode of said pentode tube to a point on said resistor, to thereby provide a regenerative feedback circuit, a resistance-capacitance parallel-T frequency determining network having one terminal connected to the first grid of said pentode tube and another terminal connected to the cathode of said follower tube, a resistor connecting said last terminal of said network to the cathode of said pentode tube, to thereby provide another feedback circuit, the constants of said system being such that it generates oscillations at a frequency determined by said constants, there being a residual feedback through said last feedback circuit which is regenerative at the oscillation frequency but not of itself sufficient to cause the production of oscillations.

7. A stable audio frequency oscillator comprising a pentode tube and a triode cathode follower tube, a connection between the anode of said pentode tube and the grid of said follower tube, a resistor in the cathode circuit of said follower tube, a connection from the cathode of said pentode tube to a point on said resistor, to thereby provide a regenerative feedback circuit, a resistance-capacitance parallel-T frequency determining network having one terminal connected to the first grid of said pentode tube and another terminal, a resistor connecting said last terminal of said network to the cathode of said pentode tube, to thereby provide another feedback circuit, the constants of said system being such that it generates oscillations at a frequency determined by the constants of said network, there being zero feedback through said last feedback circuit at the oscillation frequency.

8. A stable audio frequency oscillator comprising a pentode tube and a triode cathode follower tube, a connection between the anode of said pentode tube and the grid of said follower tube, a resistor in the cathode circuit of said follower tube having one end connected to the cathode and having the other end connected to a common ground connection, a connection from the cathode of said pentode tube to a point on said resistor, to thereby provide a regenerative feedback circuit, a resistance-capacitance parallel-T frequency determining network having one terminal connected to the first grid of said pentode tube and another terminal connected to the cathode of said follower tube and a connection to said common ground connection, to thereby provide a second feedback circuit, the constants of the system being such that it generates oscillations at a frequency determined by said constants, there being a residual feedback through said second feedback circuit which is regenerative at the oscillation frequency but the regeneration of which is not of itself sufficient to cause the production of oscillations.

9. A stable oscillation generator for generating constant frequency oscillations in the frequency range of 20 cycles to 200 kilocycles, comprising first and second vacuum tubes, first and second feedback circuits connecting different electrodes of said second tube to said first tube regeneratively for positive feedback from one tube to the other tube, the constants of said feedback circuits having values to provide an overall gain in each of said regenerative feedback circuits which is real and positive at the operating frequency.

10. The generator claimed in claim 9, one of said circuits being a frequency determining circuit having constants the values of which provide a substantial rate of change of phase shift with frequency in the neighborhood of the oscillating frequency, the other said circuit having constants which provide real positive feedback at said operating frequency.

11. A stable oscillation generator for generating constant frequency oscillations in the frequency range of 20 cycles to 200 kilocycles, comprising a high gain vacuum tube, a cathode follower tube, a first feedback circuit for said tubes connecting the cathodes of said tubes, a second feedback circuit for said tubes connecting the cathode of said cathode follower tube with the grid of said high gain vacuum tube and comprising a frequency determining resistance capacitance network, the constants of said first feedback circuit providing real positive feedback therethrough at the operating frequency, the constants of said second network providing real positive feedback therethrough at said operating frequency, the rate of change of phase shift through said first feedback circuit being substantially zero and the rate of change of phase shift through said second feedback circuit having a value substantially different from zero.

12. A stable oscillation generator, comprising first and second vacuum tubes, said first tube being a high gain tube, said second tube being a cathode follower, first and second feedback circuits coupling said tubes together regeneratively over different paths for positive feedback from one to the other, the constants of said feedback circuits having values to provide an overall gain in each of said regenerative feedback circuits which is real and positive at the operating frequency, and means including a unidirectional current passing device for controlling the amplitude of the oscillations produced by said generator.

13. A stable oscillation generator comprising first and second vacuum tubes each having an anode, a cathode and a grid, first and second feedback circuits coupling said tubes together regeneratively over different paths for positive feedback from one to the other, the constants of said feedback circuits having values to provide an overall gain in each of said regenerative circuits which is real and positive at the operating frequency, there being a common cathode resistor for both of said tubes located between the cathodes of said tubes and a point of reference potential.

14. A stable oscillation generator for generating a constant frequency over a wide range of frequencies, comprising a relatively high gain tube having a first grid, a screening electrode, an anode and a cathode, a cathode follower tube having a cathode, a grid and an anode, a first feedback circuit for said tubes including a connection between the anode of said high gain tube and the grid of the follower tube, and a common cathode connection, and a second feedback circuit for said tubes including a parallel-T frequency determining network coupled between the first grid of said high gain tube and the cathode of said follower tube.

15. A stable oscillation generator for generating a constant frequency over a wide range of frequencies, comprising a relatively high gain tube having a first grid, a screening electrode, an anode and a cathode, a cathode follower tube having a cathode, a grid and an anode, a first feedback circuit for said tubes including a connection between the anode of said high gain tube and the grid of the follower tube, and a common cathode connection, and a second feedback circuit for said tubes including a parallel-T frequency determining network coupled between the first grid of said high gain tube and the cathode of said follower tube, a resistor connecting the cathode of said high gain tube and that terminal of said network furthest removed from the first grid of said high gain tube, and means for maintaining the amplitude of oscillations constant comprising a diode having an anode connected to said terminal of said network and a cathode connected to the cathode of said high gain tube, and a voltage regulator tube for providing a reference voltage for the cathode of said diode, thus determining the amplitude of the generated oscillations.

16. A stable oscillation generator, comprising first and second vacuum tubes, said first tube being a high gain tube, said second tube being a cathode follower, first and second feedback circuits coupling said tubes together regeneratively over different paths for positive feedback from one to the other, one of said feedback circuits including a resistance-capacitance parallel-T frequency determining network, the constants of said feedback circuits having values to provide an overall gain in each of said regenerative feedback circuits which is real and positive at the operating frequency, and means including a unidirectional current passing device for controlling the amplitude of the oscillations produced by said generator.

17. A stable oscillation generator comprising first and second vacuum tubes each having an anode, a cathode and a grid, first and second feedback circuits coupling said tubes together regeneratively over different paths for positive feedback from one to the other, one of said feedback circuits including a resistance-capacitance parallel-T frequency determining network, the constants of said feedback circuits having values to provide an overall gain in each of said regenerative circuits which is real and positive at the operating frequency, there being a common cathode resistor for both of said tubes located between the cathodes of said tubes and a point of reference potential.

JOHN HARRY PRATT.

REFERENCES CITED

The following references are of record in the file of this patent:

UNITED STATES PATENTS

| Number | Name | Date |
|---|---|---|
| 2,055,375 | Cohen | Sept. 22, 1936 |
| 2,173,427 | Scott | Sept. 19, 1939 |
| 2,268,872 | Hewlett | Jan. 6, 1942 |
| 2,303,862 | Peterson | Dec. 1, 1942 |
| 2,305,262 | Lange | Dec. 15, 1942 |
| 2,386,892 | Hadfield | Oct. 16, 1945 |
| 2,394,018 | Shank et al. | Feb. 5, 1946 |